United States Patent
Ali et al.

(10) Patent No.: US 10,647,312 B2
(45) Date of Patent: May 12, 2020

(54) APPARATUS AND METHOD (71) Applicant: Castrol Limited, Pangbourne, Reading (GB)

(72) Inventors: Rana Ali, Reading (GB); David John Roach Williams, Reading (GB)

(73) Assignee: Castrol Limited, Reading (GB)

( * ) Notice: Subject to any disclaimer, the term of this patent is extended or adjusted under 35 U.S.C. 154(b) by 0 days.

(21) Appl. No.: 16/064,987

(22) PCT Filed: Dec. 16, 2016

(86) PCT No.: PCT/EP2016/081414
§ 371 (c)(1),
(2) Date: Jun. 21, 2018

(87) PCT Pub. No.: WO2017/108607
PCT Pub. Date: Jun. 29, 2017

(65) Prior Publication Data
US 2019/0001954 A1 Jan. 3, 2019

(30) Foreign Application Priority Data
Dec. 23, 2015 (GB) .................................. 1522727.5

(51) Int. Cl.
*B60W 20/00* (2016.01)
*F01M 1/02* (2006.01)
(Continued)

(52) U.S. Cl.
CPC ............. *B60W 20/00* (2013.01); *B60L 50/50* (2019.02); *B60W 10/04* (2013.01); *B60W 10/30* (2013.01);
(Continued)

(58) Field of Classification Search
CPC ...... B60W 20/00; B60W 10/04; B60W 10/30; B60L 50/50
See application file for complete search history.

(56) References Cited

U.S. PATENT DOCUMENTS 3,447,636 A * 6/1969 Bonfilio ............. F01M 11/0458
123/196 R
4,095,673 A * 6/1978 Takeuchi ............... B67D 7/845
184/1.5
(Continued)

FOREIGN PATENT DOCUMENTS

CN 203718344 7/2014
DE 10055420 5/2002
(Continued)

*Primary Examiner* — Hau V Phan
(74) *Attorney, Agent, or Firm* — McDonnell Boehnen Hulbert & Berghoff LLP (57) ABSTRACT

In one embodiment, there is provided a device for a vehicle, having:
a first interface configured to couple to at least one replaceable fluid container for a vehicle comprising a battery,
the first interface comprising at least one fluid port configured to couple to at least one fluid port of the replaceable fluid container;
a second interface configured to couple to an engine of the vehicle,
the second interface comprising at least one fluid port configured to couple to at least one fluid port of a fluid circulation system of the vehicle;
a fluid path coupled to at least one fluid port of the first interface and at least one fluid port of the second interface; and
at least one electrical pump configured to be powered and/or driven by the battery of the vehicle and to cause fluid flow.

24 Claims, 5 Drawing Sheets

(51) Int. Cl.
   *F01M 5/00*    (2006.01)
   *F01M 11/04*   (2006.01)
   *F28D 20/02*   (2006.01)
   *B60L 50/50*   (2019.01)
   *F01M 11/00*   (2006.01)
   *F01M 11/10*   (2006.01)
   *B60W 10/04*   (2006.01)
   *B60W 10/30*   (2006.01)
   *B60W 40/12*   (2012.01)
   *F04B 51/00*   (2006.01)
   *F01M 11/03*   (2006.01)
   *F28D 20/00*   (2006.01)

(52) U.S. Cl.
   CPC .............. *B60W 40/12* (2013.01); *F01M 1/02* (2013.01); *F01M 5/002* (2013.01); *F01M 11/04* (2013.01); *F01M 11/10* (2013.01); *F04B 51/00* (2013.01); *F28D 20/02* (2013.01); *B60Y 2200/91* (2013.01); *B60Y 2200/92* (2013.01); *F01M 2001/0215* (2013.01); *F01M 2011/033* (2013.01); *F01M 2011/035* (2013.01); *F01M 2011/036* (2013.01); *F01M 2011/0483* (2013.01); *F01M 2011/148* (2013.01); *F01M 2011/1473* (2013.01); *F28D 20/0034* (2013.01); *F28D 2020/0026* (2013.01)

(56) References Cited

U.S. PATENT DOCUMENTS

| | | | |
|---|---|---|---|
| 4,151,823 | A | 5/1979 | Grosse et al. |
| 5,257,678 | A | 11/1993 | Stokes |
| 5,454,354 | A | 10/1995 | Miller |
| 5,649,574 | A | 7/1997 | Turcotte et al. |
| 5,682,851 | A * | 11/1997 | Breen .................. F01M 9/108 123/196 A |
| 5,787,372 | A * | 7/1998 | Edwards ........... F01M 11/0458 123/198 DA |
| 6,286,626 | B1 * | 9/2001 | Evans ................ F01M 11/0458 141/98 |
| 6,374,797 | B1 | 4/2002 | Fischer |
| 6,708,655 | B2 | 3/2004 | Lehmann |
| 6,708,665 | B1 | 3/2004 | Lehmann |
| 8,726,661 | B2 | 5/2014 | Spicer et al. |
| 9,127,579 | B2 * | 9/2015 | Miller ................ F01M 11/0458 |
| 9,869,219 | B2 | 1/2018 | Barnes et al. |
| 9,878,822 | B2 | 1/2018 | Barnes et al. |
| 9,890,901 | B2 | 2/2018 | Brett et al. |
| 9,938,867 | B2 | 4/2018 | Brett et al. |
| 10,167,755 | B2 | 1/2019 | Andersen et al. |
| 10,358,259 | B2 | 7/2019 | Andersen et al. |
| 2004/0035639 | A1 | 2/2004 | Elhadiri |
| 2004/0211626 | A1 * | 10/2004 | Waelput ............. F01M 11/0408 184/1.5 |
| 2005/0098226 | A1 * | 5/2005 | Rounds .............. F01M 11/0458 141/65 |
| 2005/0166993 | A1 * | 8/2005 | Viken ..................... B62D 5/062 141/98 |
| 2005/0199444 | A1 | 9/2005 | Pineiro et al. |
| 2007/0119515 | A1 * | 5/2007 | Phillips .................... B67D 7/62 141/65 |
| 2008/0304976 | A1 | 12/2008 | Durtschi |
| 2010/0200609 | A1 | 8/2010 | Cadigan |
| 2011/0194953 | A1 * | 8/2011 | Schalk ............... F01M 11/0458 417/313 |
| 2011/0253092 | A1 | 10/2011 | Springer et al. |
| 2013/0048088 | A1 | 2/2013 | Miller |
| 2015/0292372 | A1 | 10/2015 | Barnes et al. |
| 2017/0089234 | A1 | 3/2017 | Dawson et al. |
| 2017/0089235 | A1 | 3/2017 | Dawson et al. |
| 2017/0101911 | A1 | 4/2017 | Barnes et al. |
| 2017/0107873 | A1 | 4/2017 | Ali et al. |
| 2017/0122151 | A1 | 5/2017 | Brett et al. |
| 2017/0183992 | A1 | 6/2017 | Barnes et al. |
| 2017/0197596 | A1 | 7/2017 | Barnes et al. |
| 2018/0258805 | A1 | 9/2018 | Goodier et al. |
| 2018/0258806 | A1 | 9/2018 | Butterworth et al. |
| 2018/0266288 | A1 | 9/2018 | Butterworth et al. |
| 2018/0266873 | A1 | 9/2018 | Goodier et al. |
| 2018/0274408 | A1 | 9/2018 | Goodier et al. |
| 2019/0003369 | A1 | 1/2019 | Lake |

FOREIGN PATENT DOCUMENTS

| | | |
|---|---|---|
| DE | 102007042109 | 3/2009 |
| DE | 102012024365 | 6/2014 |
| DE | 102014201510 | 7/2015 |
| EP | 0 252 035 | 1/1988 |
| EP | 2 096 434 | 9/2009 |
| FR | 2 633 976 | 1/1990 |
| GB | 2 508 262 | 5/2014 |
| JP | 2006 329088 | 12/2006 |
| JP | 2015/105696 | 6/2015 |
| WO | WO 2015/177316 | 11/2015 |
| WO | WO 2016/158971 | 10/2016 |

\* cited by examiner

APPARATUS AND METHOD

CROSS REFERENCE TO RELATED APPLICATIONS

This application is a National Phase application of, and claims the benefit of, International (PCT) Application No. PCT/EP2016/081414, filed Dec. 16, 2016, which claims priority to GB Patent Application No. 1522727.5, filed Dec. 23, 2015, each of which is hereby incorporated by reference in its entirety.

This invention relates to a device for a vehicle which may be coupled to a fluid system such as a fluid container. This invention also relates to associated modular unit, apparatus and vehicle. This invention also relates to a method for determining a property of a fluid in a fluid system such as a fluid container.

Many vehicle engines use one or more fluids for their operation. Such fluids are often liquids. For example, internal combustion engines use liquid lubricating oil. Also, electric engines use fluids which can provide heat exchange functionality, for example to cool the engine and/or to heat the engine, and/or to cool and heat the engine during different operating conditions. The heat exchange functionality of the fluids may be provided in addition to other functions (such as a primary function) which may include for example charge conduction and/or electrical connectivity. Such fluids are generally held in reservoirs associated with the engine and may require periodic replacement.

Such fluids often are consumed during operation of the engine. The properties of such fluids may also degrade with time so that their performance deteriorates, resulting in a need for replacement with fresh fluid. Such replacement may be an involved and time-consuming process. For example, replacement of engine lubricating oil in a vehicle engine usually involves draining the lubricating oil from the engine sump. The process may also involve removing and replacing the engine oil filter. Such a procedure usually requires access to the engine sump drain plug and oil filter from the underside of the engine, may require the use of hand tools and usually requires a suitable collection method for the drained lubricating oil.

Aspects and embodiments of the present disclosure are directed to a device for a vehicle which may be coupled to a fluid system such as a fluid container. Aspects and embodiments of the present disclosure are directed to a modular unit, to an apparatus and to a vehicle. Aspects and embodiments of the present disclosure are directed to a determination of a property of a fluid in a replaceable fluid container.

Aspects of the invention are recited in the independent claims and preferred features are recited in the dependent claims.

Some embodiments will now be described, by way of example only, with reference to the accompanying drawings, in which.

Embodiments of the present disclosure provide, as shown for example in FIGS. 1 to 5, a device 1 for a vehicle 2. The vehicle 2 comprises a battery 21.

The device 1 comprises a first interface 11 and a second interface 12. In the examples of FIGS. 1 to 5, the first interface 11 comprises a region of a single side of the device 1, and the second interface 12 comprises a region of a single side of the device 1.

The first interface 11 is configured to couple to at least one replaceable fluid container 3 for the vehicle 2. The first interface 11 comprises at least one fluid port 111 or 112 configured to couple to at least one fluid port 31 or 32 of the replaceable fluid container 3. The second interface 12 is configured to couple to an engine 22 of the vehicle 2. The second interface 12 comprises at least one fluid port 121 or 122 configured to couple to at least one fluid port 221 or 222 of a fluid circulation system 23 of the vehicle 2.

In the examples illustrated by FIGS. 1 to 5, the device 1 comprises a fluid path 13 coupled to at least one fluid port 111 or 112 of the first interface 11 and to at least one fluid port 121 or 122 of the second interface 12.

In the present disclosure, and as explained in further detail below, "replaceable" means that:

the container can be supplied with fresh and/or unused fluid, for example full with such fluid, and/or the container can be coupled to, that is e.g. inserted and/or seated and/or docked in or with the device or unit, in a non-destructive manner, and/or the container can be removed from the device or unit, in a non-destructive manner, i.e. in a manner which enables its re-coupling should that be desired, and/or the same (for example after having been refilled) or another (for example full and/or new) container can be re-coupled to the device or unit, e.g. re-inserted and/or re-seated and/or re-docked in or with the device or unit, in a non-destructive manner.

It should be understood that the term "replaceable" means that the container may be "replaced" by another new container and/or the same container after having been refilled (in other words the replaceable container may be "refillable") which may be re-coupled to the device or unit, e.g. re-inserted in the device or unit.

In the present disclosure, "in a non-destructive manner" means that integrity of the container is not altered, except maybe for breakage and/or destruction of seals (such as seals on fluid ports) or of other disposable elements of the container.

It should be understood that the term "configured to be" encompasses the meaning "is".

In the examples illustrated by FIGS. 1 to 5, the device 1 also comprises at least one electrical pump 14 configured to be powered by the battery 21 and/or driven by the battery 21. The at least one electrical pump 14 is also configured to cause fluid flow between the replaceable fluid container 3 and the fluid circulation system 23 through the fluid path 13. As will be explained in greater detail below, the electrical pump 14 may be configured to cause fluid flow from the replaceable fluid container 3 to the fluid circulation system 23 and/or from the fluid circulation system 23 to the replaceable fluid container 3.

Figure 6:
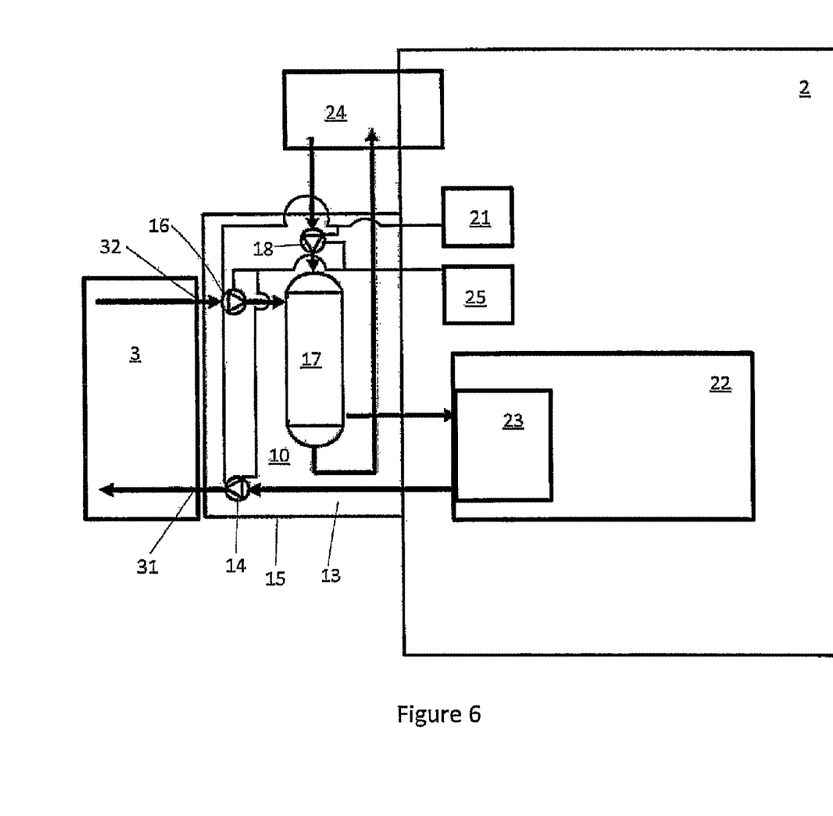
FIG. 6 shows a schematic illustration of an example unit for a vehicle, coupled to a replaceable fluid container and to an engine of the vehicle.

Embodiments of the disclosure provide, as illustrated by FIG. 6, a modular unit 10 for coupling at least one replaceable fluid container 3 for a vehicle 2 comprising a battery 21 to an engine 22 of the vehicle 2. The modular unit 10 illustrated by FIG. 6 comprises a fluid path 13, coupled to at least one fluid port 31 or 32 of the replaceable fluid container 3 and at least one fluid port 221 or 222 of a fluid circulation system 23 of the vehicle 2.

The modular unit 10 illustrated by FIG. 6 also comprises at least one electrical pump 14 configured to be powered and/or driven by the battery 21 of the vehicle 2 and to cause fluid flow between the replaceable fluid container 3 and the fluid circulation system 23 through the fluid path 13.

The modular unit may alternatively be described as a module or described as a distinct unit, that is to say that the modular unit may be a self-contained unit, or a unit/module of a system or apparatus comprising one or more units/modules. For example, the modular unit may be replaceable independently of one or more other components of the vehicle and/or engine/device to which it may be coupled.

In the examples illustrated by FIGS. 1 to 6, the electrical pump 14 of the device 1 or the unit 10 may enable fluid flow at a required hydraulic pressure and/or rate between the replaceable fluid container 3 and the fluid circulation system 23 through the fluid path 13. The electrical pump 14 of the device 1 or the unit 10 may be controlled and may thus avoid the fluid pressure being too high, which can occur with conventional mechanical pumps and which generates a waste of energy. The electrical pump 14 of the device 1 or the unit 10 may avoid the need for a relief valve back to an engine sump.

In the examples illustrated by FIGS. 1 to 6, the device 1 or unit 10 may be provided in a packaging and installed between the container 3 and the engine 22, e.g. mounted to the engine 22. The second interface 12 of the device 1 in the examples illustrated by FIGS. 1 to 5 or the unit 10 illustrated by FIG. 6 may be configured to couple to, e.g. retro-fit, a variety of different shapes of engines 22. The device 1 or unit 10 may provide an all-in-one modular packaging, external to the engine, which may couple to one or more replaceable containers and/or may be directly installed onto the engine and/or which may connect with the fluid ports of fluid supply and return lines from and to the fluid container and/or the engine.

In the examples illustrated by FIGS. 1 to 6, the device 1 or unit 10 may avoid the need for engine and vehicle under-bonnet re-design and re-packaging, for example when designing or adapting a vehicle for use with a replaceable fluid container. In examples where the fluid is an oil lubricant, the device 1 may avoid distributing oil lubricant pumps, oil lubricant paths and oil lubricant connectors at different locations in the vehicle and/or engine, and thus enhances reliability and engine integration. In examples where the fluid is an oil lubricant, the electrical pump of the device or unit may enable maintaining the oil lubricant under different desired tribological regimes.

In the examples illustrated by FIGS. 1 to 6, the device 1 or unit 10 may comprise a housing 15, which may be provided with the first interface 11 and the second interface 12 in the examples illustrated by FIGS. 1 to 5. In the examples illustrated by FIGS. 1 to 6, the housing 15 may be distinct from a housing of the container 3 and/or from the engine 22. The housing 15 may be configured to house the fluid path 13 and the at least one electrical pump 14.

As will be described in greater detail below, the device of any one of the aspects of the present disclosure may be provided as a modular unit of any one of the aspects of the present disclosure, and vice and versa. Similarly, the modular unit of any one of the aspects of the present disclosure may comprise a device of any one of the aspects of the present disclosure.

The example illustrated by FIG. 1, will now be described in greater detail. The first interface 11 is configured to couple to the replaceable fluid container 3 for the vehicle 2.

The first interface 11 comprises:

the fluid port 111, i.e. the container fluid return port, configured to couple to the fluid inlet port 31 of the replaceable fluid container 3;

the fluid port 112, i.e. the container fluid supply port, configured to couple to the fluid outlet port 32 of the replaceable fluid container 3; and a vent fluid port 113, i.e. a container vent connection port, configured to couple to a vent port 33 of the replaceable fluid container 3.

The second interface 12 comprises:

the fluid port 121, i.e. the vehicle fluid return port, configured to couple to the fluid scavenging port 221 of the fluid circulation system 23 of the vehicle 2;

the fluid port 122, i.e. the vehicle fluid supply port, configured to couple to the fluid supply port 222 of the fluid circulation system 23; and a vent fluid port 123, i.e. a vehicle vent connection port, configured to couple to a vent port 223 of the fluid circulation system 23.

The fluid path 13 couples:

the vehicle fluid return port 121 to the container fluid return port 111;

the vehicle fluid supply port 122 to the container fluid supply port 112; and the vehicle vent connection port 123 to container vent connection port 113.

The electrical pump 14 is configured to be powered and/or driven by the battery 21 of the vehicle 2 and to cause fluid flow from the fluid circulation system 23 to the replaceable fluid container 3 through the fluid path 13. The device 1 illustrated by FIG. 1 may thus provide a fluid return line to the container 3. The electrical pump 14 illustrated by FIG. 1 may be configured to act as a scavenging pump in cases where the vehicle 2 comprises a dry sump, to act as a return pump in cases where the vehicle 2 comprises a dry sump or to act as an oil pump (e.g. circulation pump or oil circulation pump) where the vehicle 2 comprises a wet sump.

Figure 1:
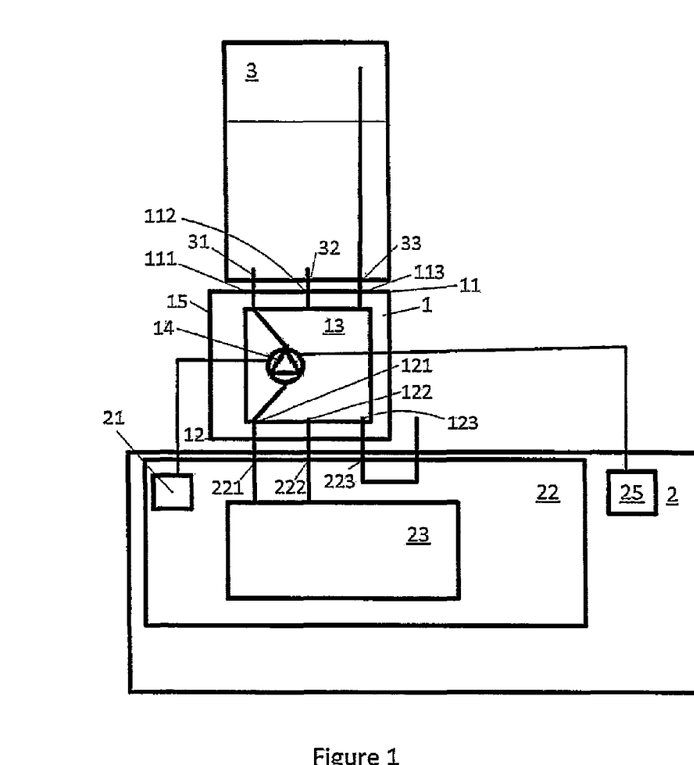
FIG. 1 shows a schematic illustration of a first example device for a vehicle, coupled to a replaceable fluid container and to an engine of the vehicle.

In the example illustrated by FIG. 1, the device 1 comprises a single electrical pump 14 configured to cause fluid flow for fluid return from the fluid circulation system 23 to the replaceable fluid container 13. In some examples, the fluid supply from the container 3 to the fluid circulation system 23 may be provided e.g. by gravity. In some examples, the fluid supply may also be provided by a pump.

In the example illustrated by FIG. 1, the first interface 11 of the device 1 is configured to couple to a single container 3, and thus the device 1 comprises a single electrical pump 14. In the example illustrated by FIG. 7, the device 1 or unit 10 is configured to couple to a plurality of replaceable fluid containers 3, and the device 1 or unit 10 comprises a plurality of pumps 14, e.g. a pump 14 dedicated to each one of the containers 3, e.g. operated based on the type of fluid in each one of the fluid container, e.g. determined based on information provided by a data provider 34 of the container 3.

Figure 7:
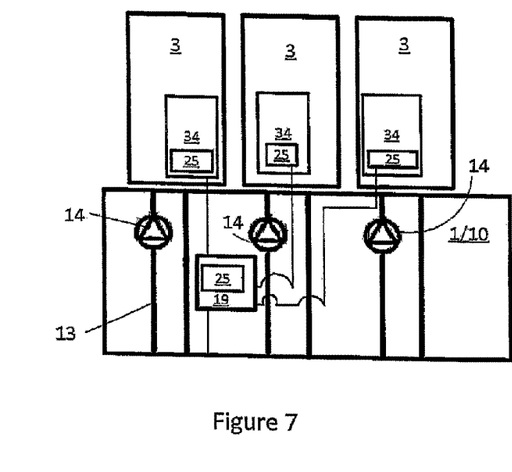
FIG. 7 shows a schematic illustration of an example device or unit for a vehicle, coupled to a plurality of replaceable fluid containers.

In the example illustrated by FIG. 1, the pump 14 of the device 1 is also configured to be controlled by a controller 25, e.g. provided on the vehicle 2. In some examples, the controller 25 may form, at least partly, part of the engine control unit (ECU) of the vehicle. Additionally or alternatively, in some examples, the controller 25 may form, at least partly, part of the device 1 or unit 10, such as part of a data transceiver 19 of the device 1 or unit 10, as illustrated by FIG. 7. In some examples, the data transceiver 19 may be configured to receive data from the data provider 34 of the container 3 and provide data to the vehicle, e.g. after a processing by a controller.

Additionally or alternatively, in some examples, the controller 25 may form, at least partly, part of the container 3, such as part of the data provider 34 of the container 3.

Additionally or alternatively, the controller 25 may not be a single entity, but may be distributed:
 in different parts of the vehicle 2, and/or
 in different parts of the device 1, and/or
 in different parts of the container 3.

Figure 2:
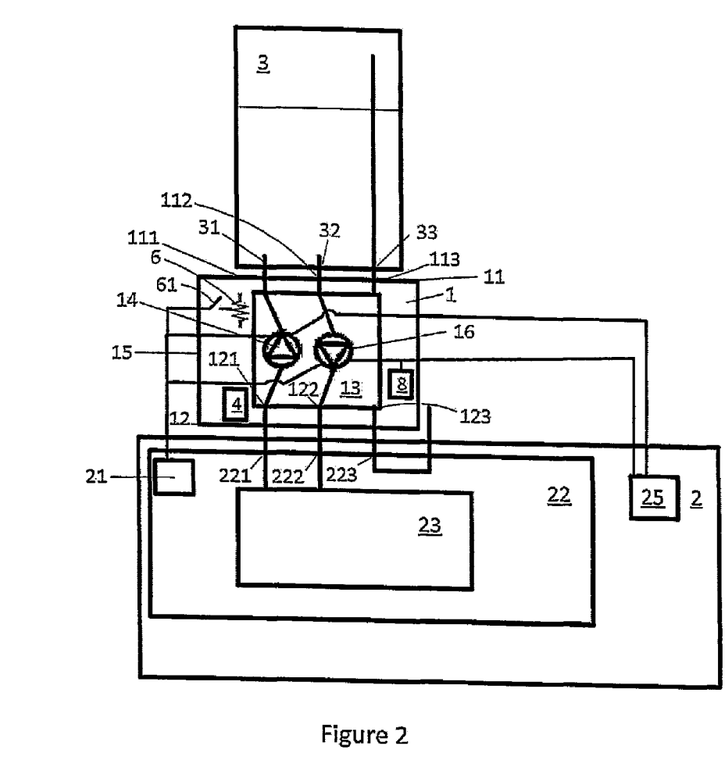
FIG. 2 shows a schematic illustration of a second example device for a vehicle, coupled to a replaceable fluid container and to an engine of the vehicle.

The example illustrated by FIG. 2 comprises the elements of the example illustrated by FIG. 1, and the elements in common will not be described here for the sake of conciseness and clarity.

In addition to the pump 14 configured to cause fluid flow from the fluid circulation system 23 to the replaceable fluid container 3 through the fluid path 13, in the example illustrated by FIG. 2 the device 1 further comprises an electrical pump 16 configured to cause fluid flow, e.g. for fluid supply, from the replaceable fluid container 3 to the fluid circulation system 23. The device 1 illustrated by FIG. 2 may thus provide:
 a fluid return line to the container 3, using the pump 14; and
 a fluid supply line to the fluid circulation system 23, using the pump 16.

In the example illustrated by FIG. 2, the electrical pump 16 of the device 1 enables fluid flow at a required hydraulic pressure and/or rate between the replaceable fluid container 3 and the fluid circulation system 23 through the fluid path 13.

The plurality of pumps 14 and 16 are configured to be controlled by the controller 25 of the vehicle 2.

The device 1 illustrated by FIG. 2 may further comprise at least one latent heat accumulator 4 thermally coupled to the fluid path 13. The latent heat accumulator 4 may be configured to:
 store, e.g. during a normal mode of operation of the vehicle 2, heat from the vehicle 2 and/or the device 1 and/or the removable fluid container 3, e.g. store heat provided from the fluid flowing through the fluid path 13 thermally coupled to the latent heat accumulator 4; and/or
 provide, e.g. during a warm up and/or start up mode of operation of the vehicle 2, heat to the vehicle 2 and/or the device 1 and/or the removable fluid container 3, e.g. to provide heat to the fluid flowing through the fluid path 13 thermally coupled to the latent heat accumulator 4.

In some examples, the latent heat accumulator 4 may comprise e.g. a phase change material, such as a salt solution, as a non-limiting example. The salt solution may comprise Barium Hydroxide, as a non-limiting example.

The device 1 illustrated by FIG. 2 may further comprise at least one electrical heater 6 thermally coupled to the fluid path 13. In the example illustrated by FIG. 2, the electrical heater 6 may be configured to be powered by the battery 21 of the vehicle 2, via e.g. a switch 61. The electrical heater 6 may be configured to provide, e.g. during a warm up and/or start up mode of operation of the vehicle 2, heat to the vehicle 2 and/or the device 1 and/or the removable fluid container 3, e.g. to provide heat to the fluid flowing through the fluid path 13 thermally coupled to the electrical heater 6.

The device 1 illustrated by FIG. 2 may thus integrate a fluid pumping function and a cooling and/or a heating function.

The device 1 illustrated by FIG. 2 further comprises a fluid temperature sensor 8 configured to provide temperature data associated with a temperature, e.g.
 the temperature associated with the fluid in the fluid path 13; and/or
 the temperature associated with the fluid in the replaceable fluid container 3.

The temperature data from the fluid temperature sensor 8 may be provided to a controller, e.g. the controller 25 or another controller for processing, as explained in greater detail below.

Figure 3:
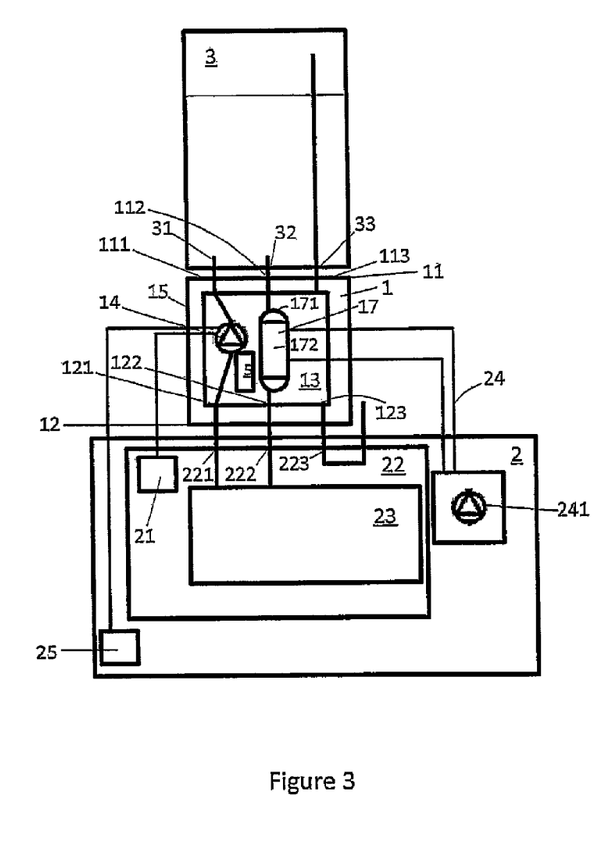
FIG. 3 shows a schematic illustration of a third example device for a vehicle, coupled to a replaceable fluid container and to an engine of the vehicle.

The example illustrated by FIG. 3 comprises the elements of the example illustrated by FIG. 1, and the elements in common will not be described here for the sake of conciseness and clarity.

In addition to the pump 14 configured to cause fluid flow from the fluid circulation system 23 to the replaceable fluid container 3 through the fluid path 13, in the example illustrated by FIG. 3 the device 1 further comprises at least one heat exchanger 17. In the example illustrated by FIG. 3, the heat exchanger 17 is thermally coupled to:
 the fluid path 13; and
 at least one temperature regulating system 24 of the vehicle 2.

In some examples, a temperature regulating fluid may flow in the temperature regulating system 24. In the example illustrated by FIG. 3, the temperature regulating system 24 comprises a pump 241 configured to cause flow of the temperature regulating fluid through the temperature regulating system 24. In some examples, the temperature regulating fluid comprises one or more of: air, hydrogen, an inert gas, water, and an anti-freeze liquid.

The heat exchanger 17 may be of any type, e.g. the heat exchanger 17 may comprise a shell 171 in which a first fluid (e.g. the fluid from the temperature regulating system 24) flows and one or more tubes 172, within the shell 171, in which a second fluid (e.g. the fluid from the fluid path 13) flows. Other types of heat exchangers are envisaged.

In some examples, the temperature regulating system 24 of the vehicle 2 may further be associated with at least one energy storage device, such as:
 an engine cooling system; and/or
 a heating, ventilating and air conditioning (HVAC) system of the vehicle; and/or
 the battery 21 of the vehicle 2; and/or
 a latent heat accumulator.

In some non-limiting examples, an engine coolant flows in the engine cooling system, and the engine cooling system may comprise one or more radiators of the vehicle 2.

In the example illustrated by FIG. 3, the device 1 further comprises a latent heat accumulator 5, which is thermally coupled to the heat exchanger 17. The latent heat accumulator 5 may be configured to:
 store, e.g. during a normal mode of operation of the vehicle 2, heat from the vehicle 2 and/or the device 1 and/or the removable fluid container 3, e.g. store heat provided from the fluid flowing through the heat exchanger 17 thermally coupled to the latent heat accumulator 5; and/or provide, e.g. during a warm up and/or start up mode of operation of the vehicle 2, heat to the vehicle 2 and/or the device 1 and/or the removable fluid container 3, e.g. to provide heat to the fluid flowing through the heat exchanger 17 thermally coupled to the latent heat accumulator 5.

In some examples, the latent heat accumulator 5 may comprise e.g. a phase change material, such as a salt solution, as a non-limiting example. The salt solution may comprise Barium Hydroxide, as a non-limiting example.

The device 1 illustrated by FIG. 3 may thus integrate a fluid pumping function and a cooling and/or a heating function.

Figure 4:
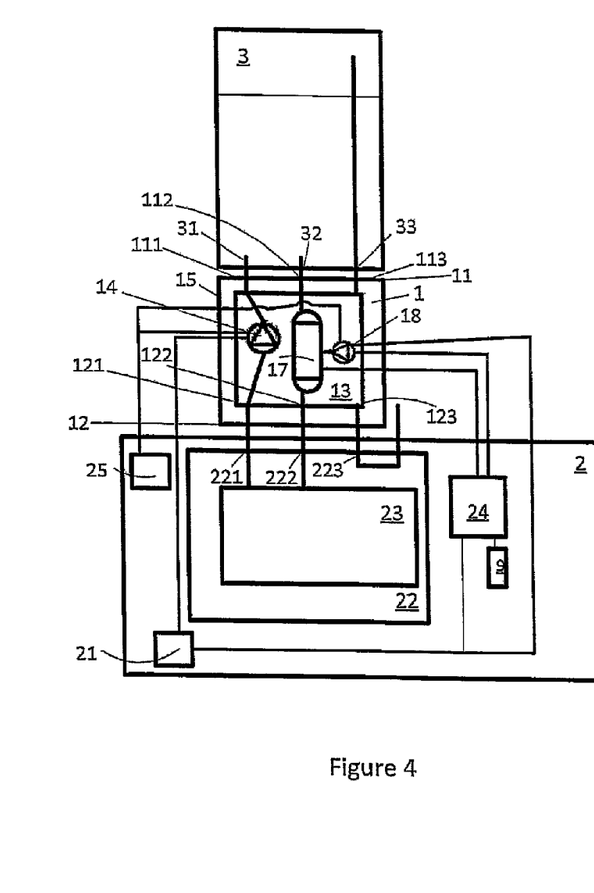
FIG. 4 shows a schematic illustration of a fourth example device for a vehicle, coupled to a replaceable fluid container and to an engine of the vehicle.

The example illustrated by FIG. 4 comprises the elements of the example illustrated by FIG. 3, except for the latent heat accumulator 5 and the pump 241, and the elements in common will not be described here for the sake of conciseness and clarity.

In addition to the pump 14 configured to cause fluid flow from the fluid circulation system 23 to the replaceable fluid container 3 through the fluid path 13, in the example illustrated by FIG. 4 the device 1 further comprises at least one further electrical pump 18 configured to be powered and/or driven by the battery 21 of the vehicle 2. In the example illustrated by FIG. 4, the electrical pump 18 is configured to cause a temperature regulating fluid of the temperature regulating system 24 of the vehicle 2 to flow through the heat exchanger 17. In some examples, the temperature regulating fluid may comprise one or more of: air, hydrogen, an inert gas, water, and an anti-freeze liquid.

In the example illustrated by FIG. 4, the pump 18 is configured to be controlled by the controller 25, e.g. provided on the vehicle 2.

The device 1 illustrated by FIG. 4 enables replacement or reduction of the pump 241 shown in FIG. 3 by the pump 18, and may simplify packaging of the engine 22 and/or the temperature regulating system 24.

The pump 18 may enhance heat exchange through the heat exchanger 17 or through at least one energy storage device, such as:

an engine cooling system; and/or a heating, ventilating and air conditioning (HVAC) system of the vehicle; and/or the battery 21 of the vehicle 2; and/or a latent heat accumulator 9 provided on the vehicle and thermally coupled to the temperature regulating system 24 of the vehicle 2.

The pump 18 may enhance pre-heating of the fluid, e.g. an oil lubricant from the replaceable fluid container, when desirable.

Figure 5:
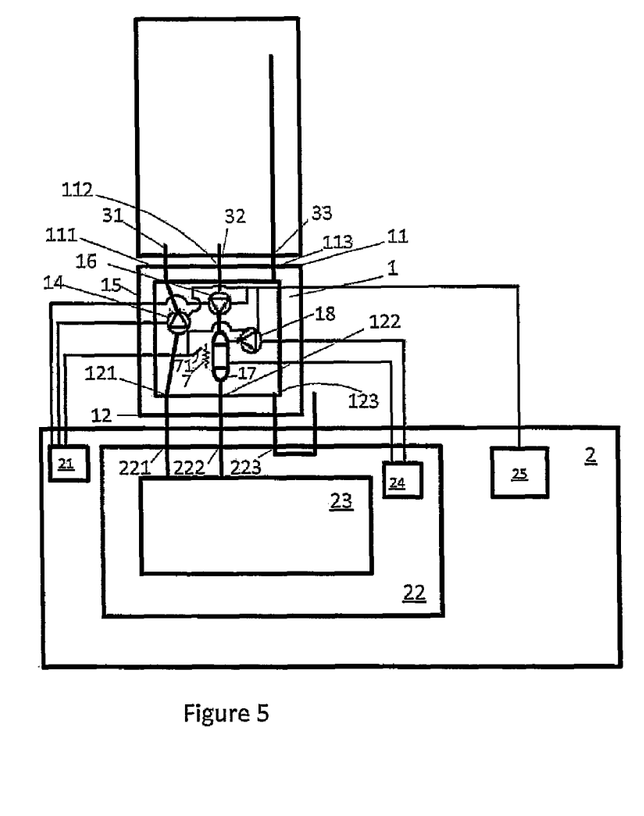
FIG. 5 shows a schematic illustration of a fifth example device for a vehicle, coupled to a replaceable fluid container and to an engine of the vehicle.

The example illustrated by FIG. 5 comprises the elements of the example illustrated by FIG. 1, and the elements in common will not be described here for the sake of conciseness and clarity.

The device illustrated by FIG. 5 comprises:

the electrical pump 14 configured to cause fluid flow, e.g. for fluid return, from the fluid circulation system 23 to the replaceable fluid container 3 through the fluid path 13;

the heat exchanger 17, thermally coupled to the fluid path 13 and the temperature regulating system 24 of the vehicle 2;

the electrical pump 16 configured to cause fluid flow, e.g. for fluid supply, from the replaceable fluid container 3 to the fluid circulation system 23, through the heat exchanger 17; and the electrical pump 18 configured to cause the temperature regulating fluid of the temperature regulating system 24 of the vehicle 2 to flow through the heat exchanger 17.

The device 1 illustrated by FIG. 5 further comprises at least one electrical heater 7 thermally coupled to the heat exchanger 17. In the example illustrated by FIG. 5, the electrical heater 7 may be configured to be powered by the battery 21 of the vehicle 2, via e.g. a switch 71. The electrical heater 7 may be configured to provide, e.g. during a warm up and/or start up mode of operation of the vehicle 2, heat to the vehicle 2 and/or the device 1 and/or the removable fluid container 3, e.g. to provide heat to the fluid flowing through the fluid path 13 thermally coupled to the heat exchanger 17.

In the device 1 illustrated by FIG. 5 the plurality of pumps 14, 16 and 18 are configured to be powered and/or driven by the battery 21 of the vehicle 2. In the device 1 illustrated by FIG. 5 the plurality of pumps 14, 16 and 18 are configured to be controlled by the controller 25 of the vehicle 2.

Embodiments of the disclosure provide, as illustrated by FIG. 6, a modular unit 10 for coupling at least one replaceable fluid container 3 for a vehicle 2 comprising a battery 21 to an engine 22 of the vehicle 2. The modular unit 10 illustrated by FIG. 6 comprises a fluid path 13, coupled to at least one fluid port 31 or 32 of the replaceable fluid container 3 and at least one fluid port 221 or 222 of a fluid circulation system 23 of the vehicle 2. The modular unit 10 illustrated by FIG. 6 also comprises at least one electrical pump 14 configured to be powered and/or driven by the battery 21 of the vehicle 2 and to cause fluid flow between the replaceable fluid container 3 and the fluid circulation system 23 through the fluid path 13.

The modular unit 10 illustrated by FIG. 6 also comprises:

a heat exchanger 17, thermally coupled to the fluid path 13 and a temperature regulating system 24 of the vehicle 2;

an electrical pump 16 configured to cause fluid flow, e.g. for fluid supply, from the replaceable fluid container 3 to the fluid circulation system 23, through the heat exchanger 17; and an electrical pump 18 configured to cause a temperature regulating fluid of the temperature regulating system 24 of the vehicle 2 to flow through the heat exchanger 17.

In the modular unit 10 illustrated by FIG. 6, the plurality of pumps 14, 16 and 18 are configured to be powered and/or driven by the battery 21 of the vehicle 2. In the modular unit 10 illustrated by FIG. 6, the plurality of pumps 14, 16 and 18 are configured to be controlled by the controller 25 of the vehicle 2.

Figure 8:
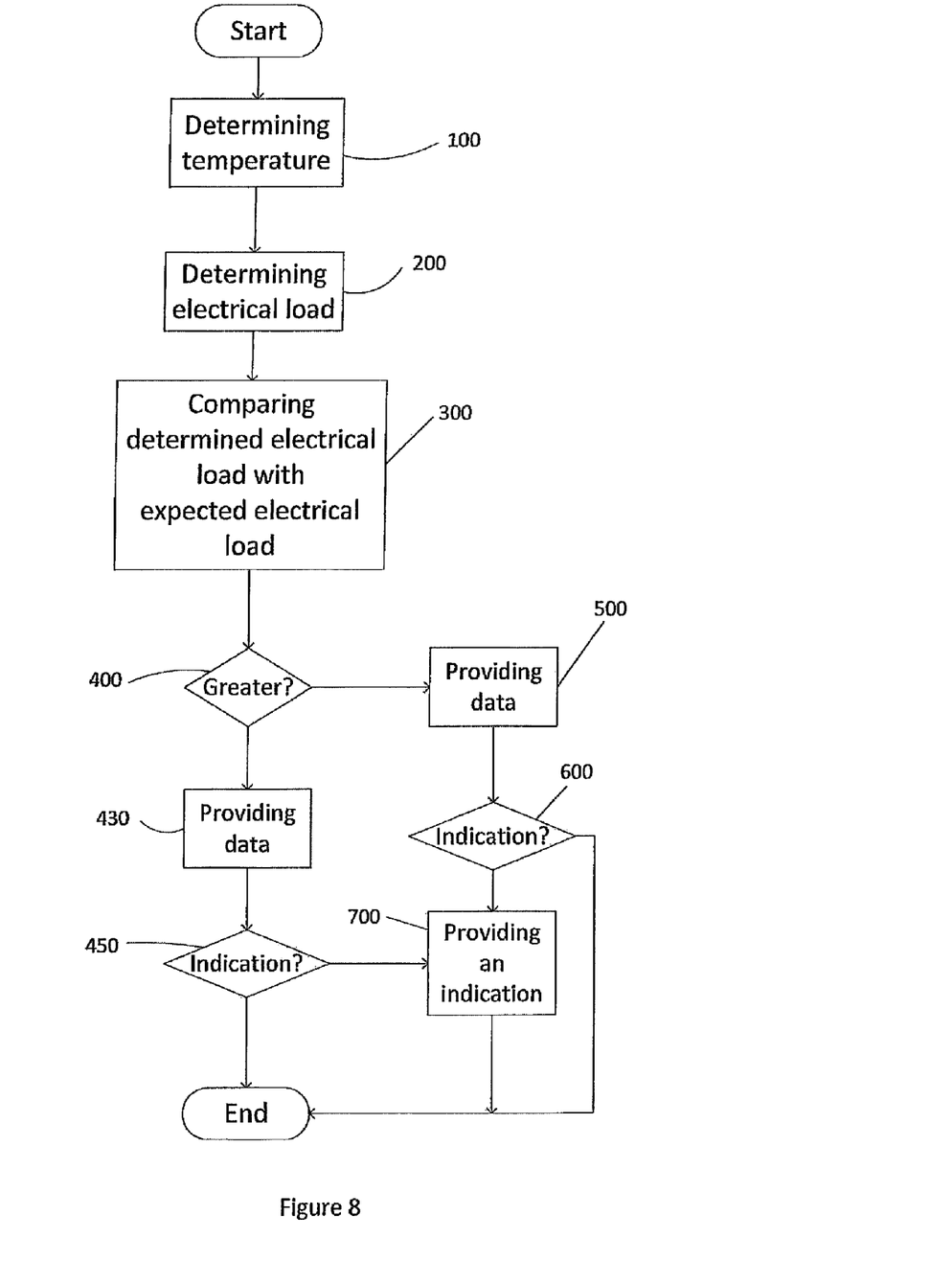
FIG. 8 shows a flow chart illustrating an example of processes involved in a method of determining a characteristic associated with a fluid in a replaceable fluid container for a vehicle.

Embodiments of the disclosure provide, as illustrated by FIG. 8, a method of determining a characteristic associated with a fluid in the replaceable fluid container 3 for the vehicle 2 comprising the fluid circulation system 23, as illustrated by FIGS. 1 to 6. In some examples, the replaceable fluid container 3 may be coupled to a fluid path 13, e.g. in the device 1 of FIGS. 1 to 5 or in the modular unit 10 of FIG. 6, coupled to the fluid circulation system 23. In some examples as illustrated by FIGS. 1 to 6, the electrical pump 14 may be configured to be powered and/or driven by the battery 21 of the vehicle 2 and to cause fluid flow between the replaceable fluid container 3 and the fluid circulation system 23 through the fluid path 13. As illustrated in the examples of FIG. 2, 4, 5 or 6, the device or the unit may comprise a plurality of pumps, such as pumps 14 and 16 as illustrated in the examples of FIG. 2, 5 or 6.

In some examples, the characteristic may comprise at least one of a viscosity of the fluid, an age of the fluid, and a purity of the fluid.

The method illustrated by FIG. 8 comprises:

determining, at 100, a temperature associated with the fluid in the replaceable fluid container 3;

determining, at 200, an electrical load associated with the electrical pump 14 and/or 16, in a predetermined mode of operation, such as a predetermined range of rotational speed of the pump 14 and/or 16; and comparing, at 300, the determined electrical load with at least one expected electrical load associated with the determined temperature and the predetermined mode of operation, to provide a measure of the characteristic of the fluid.

In some examples, determining the temperature at 100 may comprise using temperature data provided by the fluid temperature sensor 8 illustrated in FIG. 2 or provided in the modular unit. Additionally or alternatively, determining the temperature comprises using temperature data provided by one or more temperature sensors provided in and/or on the container 3 and/or the vehicle 2.

In some examples, determining at 200 the electrical load may comprise using data associated with an intensity of an electrical current flow for operation of the pump 14 and/or 16. In some examples, the data may be provided by the pump 14 and/or 16. The controller 25 illustrated e.g. in FIGS. 2 and 6 may monitor current flow to the pump 14 and/or 16 (by for example measuring a voltage drop across a resistor) to enable detection of the electrical consumption of the pump 14 and/or 16.

In some examples, the expected electrical load may be located in a look-up table mapping a set of expected electrical loads with a set of temperatures of the fluid and a set of predetermined modes of operation, such as ranges of rotational speed of the pump 14 and/or 16. In some examples, the look-up table may be stored in the controller 25 illustrated in FIG. 2 or 6, for example in a memory of the controller 25. Other locations of the look-up table may be envisaged.

In some examples, the method may comprise determining, at 400, that the determined electrical load is greater than the expected electrical load. This may correspond to a situation where the viscosity and/or the age of the fluid are too high compared to a predetermined threshold (e.g. a predetermined specification).

When the comparing comprises determining at 400 that the determined electrical load is greater than the expected electrical load associated with the determined temperature and the predetermined mode of operation, the method may comprise providing, at 500, data or an indication that the viscosity of the fluid and/or the age of the fluid are above a predetermined threshold. The predetermined threshold may correspond to a case where a fluid change is required, and the method may comprise providing, at 500, data indicating that a fluid change is required.

The method may also comprise, at 600, determining whether the determined electrical load corresponds to a situation where a running of the engine of the vehicle at a predetermined power output is required, e.g. to mitigate the risk of damage occurring to the engine. If it is the case, the method may comprise, at 700, providing data indicating that a running of an engine of the vehicle at a predetermined power output is required.

In some examples, it may be determined, at 400, that the determined electrical load is lower than the expected electrical load. This may correspond to a situation where the viscosity and/or the purity of the fluid are too low compared to a predetermined threshold (e.g. a predetermined specification). It may be the case where the fluid (e.g. a lubricating oil) is diluted by fuel and/or water.

When the comparing comprises determining at 400 that the determined electrical load is lower than the expected electrical load associated with the determined temperature and the predetermined mode of operation, the method may comprise providing, at 430, data or an indication that the viscosity of the fluid and/or the purity of the fluid are below a predetermined threshold.

The method may also comprise, at 450, determining whether the determined electrical load corresponds to a situation where a running of an engine of the vehicle at a predetermined power output is required, e.g. to allow fuel and/or water in the fluid to evaporate. If it is the case, the method may comprise, at 700, providing data indicating that a running of an engine of the vehicle at a predetermined power output is required.

The method illustrated in FIG. 8 may be performed, at least partly, by the controller 25, for example by a processor of the controller 25. In some examples, providing the measure of the characteristic of the fluid may be performed in real-time or near real-time.

Some specific embodiments of the present disclosure include:

A device for a vehicle, comprising: a first interface configured to couple to at least one replaceable fluid container for a vehicle comprising a battery, the first interface comprising at least one fluid port configured to couple to at least one fluid port of the replaceable fluid container. A second interface is configured to couple to an engine of the vehicle, the second interface comprising at least one fluid port configured to couple to at least one fluid port of a fluid circulation system of the vehicle. A fluid path is coupled to at least one fluid port of the first interface and at least one fluid port of the second interface. Also at least one electrical pump is configured to be powered and/or driven by the battery of the vehicle and to cause fluid flow between the replaceable fluid container and the fluid circulation system through the fluid path.

The device of embodiment 1, may further comprise at least one heat exchanger thermally coupled to the fluid path and at least one temperature regulating system of the vehicle.

The device of embodiment 2, may comprise a further electrical pump configured to be powered and/or driven by the battery of the vehicle and to cause a temperature regulating fluid flow through the heat exchanger.

The device of embodiment 3, wherein the temperature regulating fluid may comprise one or more of: air, hydrogen, an inert gas, water, and an anti-freeze liquid.

The device of any one of embodiments 2 to 4, may further comprise at least one latent heat accumulator thermally coupled to the heat exchanger.

The device of any one of embodiments 1 to 5, may further comprise at least one latent heat accumulator thermally coupled to the fluid path.

The device of any one of embodiments 2 to 6, may further comprise at least one electrical heater thermally coupled to the heat exchanger.

The device of any one of embodiments 1 to 7, may further comprise at least one electrical heater thermally coupled to the fluid path.

The device of embodiment 7 or 8, wherein the electrical heater may be configured to be powered by the battery of the vehicle.

The device of any one of embodiments 3 to 9, wherein the further electrical pump may be configured to be controlled by a controller of the vehicle, such as the electronic control unit.

The device of any one of embodiments 1 to 10, wherein the electrical pump configured to cause fluid flow between the replaceable fluid container and the fluid circulation system may be configured to be controlled by a controller of the vehicle, such as an electronic control unit.

The device of any one of embodiments 1 to 11, may further comprise a fluid temperature sensor configured to provide data to a controller of the vehicle, such as an electronic control unit.

The device of any one of embodiments 1 to 12, wherein the vehicle may comprise at least one electric drivetrain and the battery of the vehicle is configured to provide at least a part of an electrical power required for operation of the electric drivetrain.

The device of embodiment 13, wherein the vehicle is a hybrid vehicle.

The device of any one of embodiments 1 to 14, wherein the battery of the vehicle has a nominal voltage of more than 24V, such as a voltage equal to or greater than 48V.

The device of any one of embodiments 2 to 15, wherein the temperature regulating system of the vehicle is further associated with at least one of an engine cooling system and a heating, ventilating and air conditioning system of the vehicle.

The device of any one of embodiments 1 to 16, further comprising a housing: provided with the first interface and the second interface; and configured to house the fluid path and the electrical pump.

The device of any one of embodiments 1 to 17, wherein the device is a modular unit and wherein the fluid path is configured to couple at least one fluid port of the first interface to at least one fluid port of the second interface.

A modular unit for coupling at least one replaceable fluid container to a vehicle comprising a battery to an engine of the vehicle, the modular unit comprises a fluid path coupleable to at least one fluid port of the replaceable fluid container and at least one fluid port of a fluid circulation system of the vehicle. Also at least one electrical pump configured to be powered and/or driven by the battery of the vehicle and to cause fluid flow between the replaceable fluid container and the fluid circulation system through the fluid path.

The modular unit of embodiment 19, further comprising a device of any one of embodiments 2 to 16.

The device of any one of embodiments 1 to 18 or the modular unit of embodiment 19 or 20, wherein the fluid in the container is one or more of: a lubricating oil, a de-icer, a hydraulic fluid, a pneumatic fluid, a washer fluid, a fuel additive, a charge conduction liquid, an electrical connectivity liquid, and a heat exchange fluid.

A method of determining a characteristic associated with a fluid in a replaceable fluid container for a vehicle comprising a fluid circulation system, the method comprises: determining a temperature associated with the fluid in the replaceable fluid container, wherein the replaceable fluid container is coupled to a fluid path coupled to the fluid circulation system, and wherein at least one electrical pump is configured to be powered and/or driven by the battery of the vehicle and to cause fluid flow between the replaceable fluid container and the fluid circulation system through the fluid path. Also determining an electrical load associated with the electrical pump in a predetermined mode of operation. Also comparing the determined electrical load with at least one expected electrical load associated with the determined temperature and the predetermined mode of operation, to provide a measure of the characteristic of the fluid.

The method of embodiment 22, wherein the characteristic comprises at least one of a viscosity of the fluid, an age of the fluid, and a purity of the fluid.

The method of embodiment 23, further comprises: providing data or an indication that the viscosity of the fluid and/or the age of the fluid are above a predetermined threshold, when the comparing comprises determining that the determined electrical load is greater than the expected electrical load associated with the determined temperature and the predetermined mode of operation.

The method of embodiment 24, further comprises: providing data or an indication indicating that a fluid change is required.

The method of embodiment 23, further comprises: providing data or an indication that the viscosity of the fluid and/or the purity of the fluid are below a predetermined threshold, when the comparing comprises determining that the determined electrical load is lower than the expected electrical load associated with the determined temperature and the predetermined mode of operation.

The method of any one of embodiments 24 to 26, further comprising providing data or an indication indicating that a running of an engine of the vehicle at a predetermined power output is required.

The method of any one of embodiments 22 to 27, wherein the electrical pump is located in the device of any one of embodiments 1 to 18 or in the modular unit of embodiment 19 or 20.

The method of embodiment 28, wherein determining the temperature comprises using data from one or more temperature sensors associated with: the replaceable container, and/or the vehicle, and/or the device, and/or the modular unit.

The method of any one of embodiments 22 to 29, wherein the fluid in the container is one or more of: a lubricating oil, a de-icer, a hydraulic fluid, a pneumatic fluid, a washer fluid, a fuel additive, a charge conduction liquid, an electrical connectivity liquid, and a heat exchange fluid.

Apparatus comprising: the device of any one of embodiments 1 to 18 or the modular unit of embodiment 19 or 20, and at least one replaceable fluid container for a vehicle.

The apparatus of embodiment 31, wherein the fluid in the container is one or more of: a lubricating oil, a de-icer, a hydraulic fluid, a pneumatic fluid, a washer fluid, a fuel additive, a charge conduction liquid, an electrical connectivity liquid, and a heat exchange fluid.

In the examples of FIGS. 1 to 6, the device 1 or the unit 10 and the replaceable fluid container 3 are illustrated as not being a part of the vehicle 2. It should be understood that, in some examples, the device 1 and/or the unit 10 and/or the replaceable fluid container 3 may form, at least partly, part of the vehicle 2. In such examples, the device 1 and/or the unit 10 and/or the replaceable fluid container 3 may be located under a bonnet of the vehicle 2.

It should be understood that the apparatus comprising the device of any aspect of the disclosure or the modular unit of any aspect of the disclosure may comprise, at least partly, or may be:

a dock for coupling to the one or more replaceable fluid containers, and/or the vehicle, and/or a part of the vehicle, other than the dock. In such examples, the part of the vehicle may comprise, at least partly, the engine of the vehicle.

The processor associated with the controller 25 may be a controller such as a microcontroller or the like with the controller managing communication (which may be encrypted communication) with the device 1 and/or the unit 10 and (so with the temperature sensor when present) and/or with the vehicle 2, for example with a communications (e.g. controller area network (CAN) bus that couples with the engine control unit (ECU) or engine management system.

The processor associated with the controller 25 may use the temperature measured by the temperature sensor to determine the temperature of the fluid in the fluid container. The processor may apply a correction to the temperature measurement to determine the temperature of the fluid in the fluid container from the device 1 and/or the unit 10 temperature sensor. For example, the device 1 and/or the unit 10 temperature sensor may be positioned at a given distance from the container and a correction factor may be applied in order to compensate for the distance from the temperature sensor to the fluid.

The container 3 may be a container for a fluid which is a liquid. Examples of suitable liquids include engine lubricating oil and heat exchange fluid for an electric engine.

The data provider of the replaceable fluid container may comprise a processor. The data provider may comprise a memory for storing data describing the fluid in the replaceable fluid container. For example, the memory may store data including at least one of: the grade of the fluid, the type of fluid, the date on which the container was filled or refilled, a unique identifier of the container, an indication of whether the container is new, or has previously been refilled or replaced, an indication of the vehicle mileage, the number of times the container has been refilled or reused, and the total mileage for which the container has been used.

The processor associated with the controller 25 may also read and/or write data to a memory or data store of the data provider of the container. This data may be encrypted and may include vehicle data and sensor parameters. Data storage may be carried out at start-up and periodically as a vehicle carrying the container accumulates miles of distance traveled and duration of engine running.

One or more of the pumps may be driven by the battery, such as by using the power of the battery 21, such as being driven by an electromechanical device powered by the battery.

In some examples, the container 3 may be provided as a self-contained container containing fresh, refreshed or unused lubricating oil which may easily replace a container (on the device 1 or unit 10) which is empty or contains used or spent lubricating oil. The container 3 may contain a filter. If the container 3 also comprises the filter, the filter is also replaced together with the spent or used lubricating oil. Thus, a replaceable fluid container 3 containing spent or used lubricating oil retained in fluidic communication with the vehicle engine fluid circulation system 23 may be disconnected from the vehicle engine fluid circulation system 23, removed from the vehicle and replaced by a container containing fresh, refreshed or unused lubricating oil and if present a fresh, renewed or new filter.

In some examples, a part of the container 3 (for example a part comprising the ports and/or the filter when a filter is present) may be separated from another part of the container, and a new part may be attached to the other part. Parts may thus be re-used and/or recycled.

In some examples, the vehicle may comprise at least one electric drivetrain. In such examples, the battery of the vehicle may be configured to provide at least a part of an electrical power required for operation of the electric drivetrain.

The disclosure applies to vehicles with batteries of any nominal voltages (e.g. 12V). In some examples, the battery of the vehicle may have a nominal voltage of more than 24V, such as a voltage equal to or greater than 48V. In some examples, vehicle electrical systems comprising batteries with nominal voltage of more than 24V enable operation of the electrical pumps. Batteries with nominal voltage of more than 24V may provide sufficient electrical energy to provide on-demand pumping pressures.

In some examples, the vehicle may be a hybrid vehicle.

The engine lubricating oil may comprise at least one base stock and at least one engine lubricating oil additive. Suitable base stocks include bio-derived base stocks, mineral oil derived base stocks, synthetic base stocks and semi synthetic base stocks. Suitable engine lubricating oil additives are known in the art. The additives may be organic and/or inorganic compounds. Typically, the engine lubricating oil may comprise about 60 to 90% by weight in total of base stocks and about 40 to 10% by weight additives. The engine lubricating oil may be a lubricating oil for an internal combustion engine. The engine lubricating oil may be a lubricating oil for a spark ignition internal combustion engine. The engine lubricating oil may be a lubricating oil for a compression ignition internal combustion engine. The engine lubricating oil may be a mono-viscosity grade or a multi-viscosity grade engine lubricating oil. The engine lubricating oil may be a single purpose lubricating oil or a multi-purpose lubricating oil.

The container may be a container for heat exchange fluid for an electric engine. Thus, the container may contain heat exchange fluid for an electric engine. In such a case, the container may be provided as a self-contained container containing fresh, refreshed or unused heat exchange fluid for an electric engine which may easily replace a container (on the device 1 or unit 10) which can be empty or can contain used or spent heat exchange fluid. If the container also comprises a filter, this also is replaced together with the spent or used heat exchange fluid.

Electric engines may require heat exchange fluid to heat the engine and/or cool the engine. This may depend upon the operating cycle of the engine. Electric engines may also require a reservoir of heat exchange fluid. The replaceable fluid container may provide a heat storage container in which heat exchange fluid may be stored for use to heat the electric engine when required. The replaceable fluid container may provide a container for storage of coolant at a temperature below the operating temperature of the engine for use to cool the electric engine when required.

Suitable heat exchange fluids for electric engines, which may have additional functionality (such as the primary function) which may include for example charge conduction and/or electrical connectivity, may be aqueous or non-aqueous fluids. Suitable heat exchange fluids for electric engines may comprise organic and/or non-organic performance boosting additives. Suitable heat exchange fluids may be man-made or bio-derived, for example Betaine. The heat exchange fluids may have fire retarding characteristics and/or hydraulic characteristics. Suitable heat exchange fluids include phase change fluids. Suitable heat exchange fluids include molten metals or salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

The fluid may be any type of fluid circulated in the engine and/or circulated in any fluid circulation system associated with the engine (that is the fluid is not necessarily circulated in the engine) to support a function of the engine and/or the vehicle. The function may be an ancillary function of the engine. For example the fluid may be a de-icer and/or any hydraulic fluid such as a fluid used in braking systems, and/or a pneumatic fluid, a washer fluid, a fuel additive or any other fluid associated with any function of the engine and/or the vehicle.

The disclosure may be applied to vehicles having a "dry sump" or a "wet sump".

The first interface of the device 1 may form, at least partly, a dock where the one or more containers can be inserted and/or seated and/or docked. Similarly, the unit 10 may comprise an interface which may form, at least partly, a dock where the one or more containers can be inserted and/or seated and/or docked. The dock may be a physical structure in which the container is seated and then docked. As another possibility, the dock may simply be a fluid coupling or couplings of the engine fluid circulation system for coupling to the at least one fluid port of the container.

In some examples, fluid outlet ports may comprise a non-return valve. The non-return valve may prevent or at least inhibit fluid from draining back to the container when the engine is not operating and may help keep a fluid line to a circulating pump full of fluid so that circulation of fluid is immediate when operation of the engine is started. Additionally or alternatively, fluid inlet ports may comprise a control valve or shut-off valve which may be closed when the vehicle engine is not operating, for example to prevent or reduce fluid draining from the container to the engine. Additionally or alternatively, vent ports may not contain any valves because fluid, for example gas and/or vapour, may be required to flow both to and from the container through the vent port when the container is connected to the vehicle engine fluid circulation system.

The fluid ports may comprise fluid couplings, which may be self-sealing.

Suitable vehicles include motorcycles, earthmoving vehicles, mining vehicles, heavy duty vehicles and passenger cars. Powered water-borne vessels are also envisaged as vehicles, including yachts, motor boats (for example with an outboard motor), pleasure craft, jet-skis and fishing vessels. Applications of the disclosure are envisaged for parts only of the vehicles, for example parts including one or more moving parts (for example a gearbox)

The container may be manufactured from metal and/or plastics material. Suitable materials include reinforced thermoplastics material which for example, may be suitable for operation at temperatures of up to 150° C. for extended periods of time.

The container may comprise at least one trade mark, logo, product information, advertising information, other distinguishing feature or combination thereof. The container may be printed and/or labelled with at least one trade mark, logo, product information, advertising information, other distinguishing feature or combination thereof. This may have an advantage of deterring counterfeiting. The container may be of a single colour or multi-coloured. The trademark, logo or other distinguishing feature may be of the same colour and/or material as the rest of the container or a different colour and/or material as the rest of the container. In some examples, the container may be provided with packaging, such as a box or a pallet. In some examples, the packaging may be provided for a plurality of containers, and in some examples a box and/or a pallet may be provided for a plurality of containers.

With reference to the drawings in general, it will be appreciated that schematic functional block diagrams are used to indicate functionality of devices, units, elements, systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout devices, units, elements, and apparatus of the disclosure. In some embodiments the function of one or more elements shown in the drawings may be integrated into a single functional unit.

The above embodiments are to be understood as illustrative examples. Further embodiments are envisaged. It is to be understood that any feature (such as pumps, heat exchangers, heaters, latent heat accumulators, sensors) described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and devices, units, elements, and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

Other variations and modifications of the apparatus will be apparent to persons of skill in the art in the context of the present disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:

1. A device for a vehicle, comprising:
   a first interface configured to couple to at least one replaceable fluid container for a vehicle comprising a battery,
      the first interface comprising at least one fluid port configured to couple to at least one fluid port of the replaceable fluid container;
   a second interface configured to couple to an engine of the vehicle,
      the second interface comprising at least one fluid port configured to couple to at least one fluid port of a fluid circulation system of the vehicle;
   a fluid path coupled to the at least one fluid port of the first interface and the at least one fluid port of the second interface; and
   at least one electrical pump configured to be powered or driven by the battery of the vehicle and to cause fluid flow between the replaceable fluid container and the fluid circulation system through the fluid path.

2. The device of claim 1, wherein the at least one electrical pump comprises:
   an electrical pump configured to cause fluid flow for fluid supply from the replaceable fluid container to the fluid circulation system; or
   an electrical pump configured to cause fluid flow for fluid return from the fluid circulation system to the replaceable fluid container.

3. The device of claim 2, further comprising:
   at least one heat exchanger thermally coupled to the fluid path and at least one temperature regulating system of the vehicle.

4. The device of claim 3, wherein the temperature regulating system of the vehicle is further associated with at least one of an engine cooling system and a heating, ventilating and air conditioning system of the vehicle.

5. The device of claim 3, further comprising a further electrical pump configured to be powered or driven by the battery of the vehicle and to cause a temperature regulating fluid flow through the heat exchanger.

6. The device of claim 5, wherein the temperature regulating fluid comprises one or more of: air, hydrogen, an inert gas, water, and an anti-freeze liquid.

7. The device of claim 5, wherein the further electrical pump is configured to be controlled by a controller of the vehicle.

8. The device of claim 3, further comprising:
   at least one latent heat accumulator thermally coupled to the heat exchanger; or
   at least one electrical heater thermally coupled to the heat exchanger.

9. The device of claim 8, wherein the at least one electrical heater is configured to be powered by the battery of the vehicle.

10. The device of claim 1, further comprising:
    at least one latent heat accumulator thermally coupled to the fluid path or
    at least one electrical heater thermally coupled to the fluid path.

11. The device of claim 1, wherein the electrical pump configured to cause fluid flow between the replaceable fluid container and the fluid circulation system is configured to be controlled by a controller of the vehicle or
    further comprising a fluid temperature sensor configured to provide data to the controller of the vehicle.

12. The device of claim 11, wherein the controller of the vehicle comprises the electronic control unit.

13. The device of claim 1, wherein the vehicle comprises at least one electric drivetrain and the battery of the vehicle is configured to provide at least a part of an electrical power required for operation of the electric drivetrain.

14. The device of claim 13, wherein the vehicle is a hybrid vehicle, or wherein the battery of the vehicle has a nominal voltage of more than 24V.

15. The device of claim 14, wherein the nominal voltage is equal to or greater than 48V.

16. The device of claim 1, further comprising a housing:
    provided with the first interface and the second interface; and
    configured to house the fluid path and the electrical pump.

17. The device of claim 1, wherein the fluid in the container is one or more of:
    a lubricating oil,
    a de-icer,
    a hydraulic fluid,
    a pneumatic fluid,
    a washer fluid,
    a fuel additive,
    a charge conduction liquid,
    an electrical connectivity liquid, and
    a heat exchange fluid.

18. A method of determining a characteristic of a fluid in a replaceable fluid container for a vehicle comprising a fluid circulation system, wherein the method is performed by a controller, the method comprising:
    determining, using one or more temperature sensors, a temperature associated with the fluid in the replaceable fluid container;
       wherein the replaceable fluid container is coupled to a fluid path coupled to the fluid circulation system, and
       wherein at least one electrical pump is configured to be powered or driven by a battery of the vehicle and to cause fluid flow between the replaceable fluid container and the fluid circulation system through the fluid path;
    determining an electrical load associated with the electrical pump in a predetermined mode of operation; and
    comparing the determined electrical load with at least one expected electrical load associated with the determined temperature and the predetermined mode of operation, to provide a measure of the characteristic of the fluid.

19. The method of claim 18, wherein the characteristic of the fluid comprises at least one of a viscosity of the fluid, an age of the fluid, and a purity of the fluid.

20. The method of claim 19, further comprising: providing data or an indication that the viscosity of the fluid or the age of the fluid are above a predetermined threshold, when the comparing comprises determining that the determined electrical load is greater than the expected electrical load associated with the determined temperature and the predetermined mode of operation.

21. The method of claim 19, further comprising providing data indicating that a fluid change is required.

22. The method of claim 19, further comprising: providing data or an indication that the viscosity of the fluid or the purity of the fluid are below a predetermined threshold, when the comparing comprises determining that the determined electrical load is lower than the expected electrical load associated with the determined temperature and the predetermined mode of operation.

23. The method of claim 19, further comprising: providing data or an indication indicating that a running of an engine of the vehicle at a predetermined power output is required.

24. The method of claim 19, wherein the one or more temperature sensors are associated with:
- the replaceable fluid container, or
- the vehicle, or
- a device, or
- a modular unit.

* * * * *